Aug. 4, 1931.  R. HEIKENS  1,817,256
DIRIGIBLE HEADLIGHT
Filed June 11, 1930  2 Sheets-Sheet 1
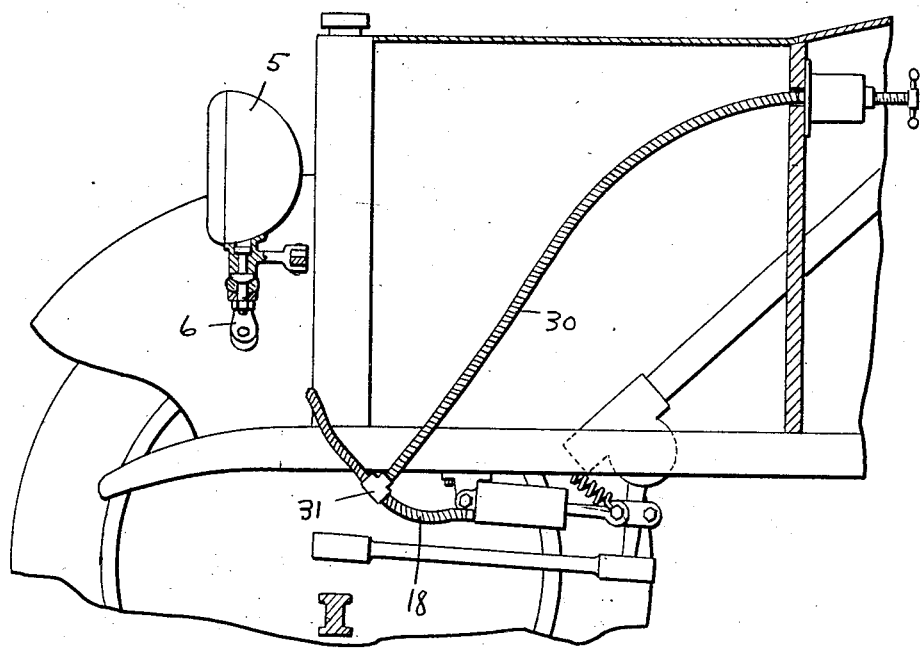
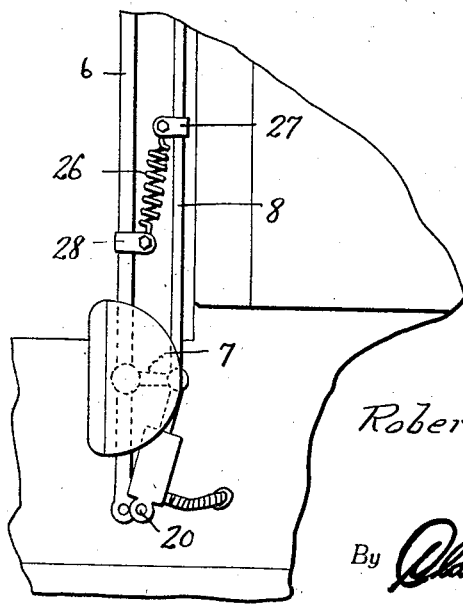
Robert Heikens, Inventor
By Clarence A. O'Brien, Attorney Aug. 4, 1931.  R. HEIKENS  1,817,256
DIRIGIBLE HEADLIGHT
Filed June 11, 1930  2 Sheets-Sheet 2
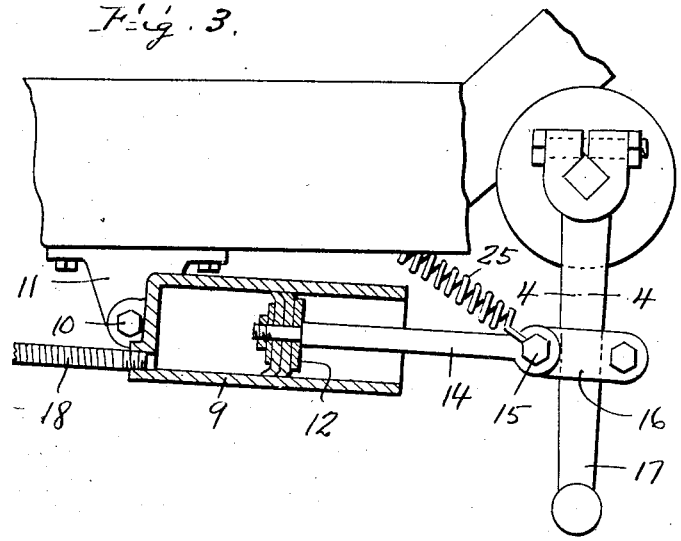
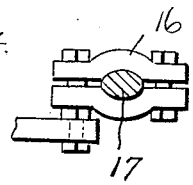
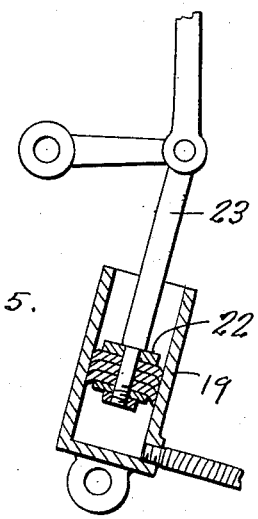
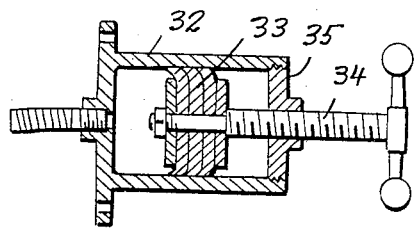
Robert Heikens, Inventor
By Clarence A. O'Brien, Attorney Patented Aug. 4, 1931

1,817,256

UNITED STATES PATENT OFFICE

ROBERT HEIKENS, OF LAKE FOREST, ILLINOIS

DIRIGIBLE HEADLIGHT

Application filed June 11, 1930. Serial No. 460,472.

The present invention relates to dirigible headlights for automobiles and the like and has for its prime object to provide dirigible headlights operable by the steering mechanism through the intermediacy of the cylinders and pistons.

Another very important object of the invention resides in the provision of a dirigible headlight operating mechanism of this nature which is exceedingly simple in construction, adjustable, easy to apply, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be more fully described and claimed.

In the drawings:

Figure 1 is a detail sectional view of the front portion of an automobile showing my apparatus applied, Figure 2 is a fragmentary top plan view thereof, Figure 3 is a longitudinal section through the power cylinder, Figure 4 is a detail section taken substantially on the line 4—4 of Figure 3, Figure 5 is a sectional view through the other cylinder, and Figure 6 is a sectional view through a third adjusting cylinder.

Referring to the drawings in detail it will be seen that numerals 5 denote headlights rockable on a cross bracket rod 6. Each headlight is provided with a crank 7 to which is engaged a connecting rod 8.

Power cylinder 9 has one end rockably mounted as at 10 on a bracket 11 depending from the frame of the automobile. A piston or plunger 12 is in the cylinder and has a rod 14 connected thereto and projecting from the rear end of the cylinder and pivotally engaged as at 15 with an adjustable clamp 16 on the steering arm 17. A conduit 18 leads from the center of the cylinder 9 to a cylinder 19 which has a pivotal mounting 20 at one end and has a piston or plunger 22 therein from which a rod 23 projects being pivotally connected with the connecting rod 8. The cylinders 9 and 19 and the conduit 8 are filled with fluid such as oil or the like between their pistons and therefore when the piston 12 is moved the piston 22 is moved thereby turning the headlights in the direction in which the automobile is being steered.

A spring 25 is anchored on the frame of the automobile and engaged with the pivot 15 while another spring 26 is engaged as at 27 with the connecting rod 8 and as at 28 with the bracket rod 6 and these springs tend to hold the headlights in a straight head position.

A by-path conduit 30 is coupled as at 31 with the conduit 18 and leads from a cylinder 32 on the dashboard of the automobile. A plunger 33 is in the cylinder 32 and is actuated by a threaded rod 34 through a head 35 threaded in the cylinder. Thus this piston 33 may be adjusted so as to maintain the proper amount of fluid in the conduit 18 and cylinders 9 and 19 so that the headlights will operate in proper unison with the steering mechanism.

It is thought that the construction, operation, utility and advantages of this invention will now be quite apparent to those skilled in this art without a more detailed description.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

In combination with a vehicle, a steering apparatus including a steering arm, a pair of headlights, means for mounting the headlights so that the same may be rocked from side to side, cranks on the headlights, a connecting rod between the cranks, a spring connected with the rod for holding the lamps in a straight position, a cylinder, a plunger in the cylinder, means operatively connecting the plunger with the steering arm, a second cylinder, a plunger in the second cylinder, means operatively connecting the second plunger with the connecting rod, a conduit between the cylinders, a supply cylinder located adjacent the driver's seat, a conduit connected to said supply cylinder and to the first mentioned conduit and a manually operated plunger in the supply cylinder which when operated will cause fluid to flow from the supply cylinder to the other cylinders and conduit to replenish the fluid therein.

In testimony whereof I affix my signature.

ROBERT HEIKENS.